LEE GROPPER
INVENTOR.

July 9, 1968  L. GROPPER  3,391,597
CENTRIFUGE APPARATUS HAVING A TWO SECTOR SAMPLE HOLDER
Filed Sept. 30, 1963  2 Sheets-Sheet 2

LEE GROPPER
INVENTOR.

BY
*Flehr and Swain*
ATTORNEYS

United States Patent Office 3,391,597
Patented July 9, 1968

3,391,597
CENTRIFUGE APPARATUS HAVING A TWO
SECTOR SAMPLE HOLDER
Lee Gropper, Sunnyvale, Calif., assignor to Beckman
Instruments, Inc., a corporation of California
Filed Sept. 30, 1963, Ser. No. 312,671
7 Claims. (Cl. 88—14)

ABSTRACT OF THE DISCLOSURE

A centrifuge system including a rotor adapted to carry a sample cell assembly having two independent cell sectors one of which contains a solution adapted to serve as a reference and the other of which holds the sample in solution to be analyzed. The cell assembly is sealed at either end by means of a pair of transparent windows one of which includes a generally rectangular portion and a wedge-shaped portion. The generally rectangular portion cooperates with one cell sector to transmit the light traveling through this sector of the cell assembly in a first path and the wedge-shaped portion fits over the other sector to direct the light rays associated with this sector in a second path. The analyzing light is provided by a source of light acting in conjunction with a collimating lens to direct the light through each sector of the sample cell assembly. A first mask having an aperture therein is disposed adjacent to the cell assembly and is adapted to successively transmit the light associated with each of the sectors as the cell is rotated past the mask. A recording means is provided including a camera lens and a photographic plate to record the images from the respective solutions in the sector. A second mask is located intermediate of the first mask and of the recording means to selectively intercept the light associated with one of the sectors so as to permit the recording of only one sector image at a time.

---

This invention relates generally to an optical system for centrifuges and more particularly to an ultraviolet absorption system for centrifuges employing double sector cells.

In certain analytical centrifuge apparatus, the sample cell which is supported by the rotor is repetitively rotated past an optical system so that the sample material within the cell can be optically analyzed. Whenever concentration distributions are to be determined during ultracentrifugation, it is usually the distribution of the solute particles which is of interest. Since this is superimposed on the solute distribution, base line runs are necessary. Thus, in general, two runs are necessary: one with the solution of interest, and the second with just the solvent under similar conditions. The solvent pattern formed on a photographic plate is then subtracted from the solution pattern formed at a different place on said photographic plate to give the correct solute distribution.

In recent years, there have been introduced double sector cells, that is, centrifuge cells which include two cell portions in a single cell assembly. This type of cell provides two images. These images have been combined in various types of optical systems. However, double sector cells have not been, in the past, useful in absorption analysis such as ultraviolet absorption analysis. Absorption analysis is highly desirable since the double sector cell can be used for studies in synthetic boundary, capillary-type double-sector cell work, the extent of backward flow during centrifugation, the sedimentation of slow components in the presence of fast ones, or the analysis of systems of interacting species.

It is a general object of the present invention to provide an optical system for double sector cell absorption analysis.

It is another object of the present invention to provide an improved system for ultraviolet absorption studies employing double sector cells.

It is a further object of the present invention to provide a simple optical system for adapting double sector cells to ultraviolet absorption studies.

It is still a further object of the present invention to provide an absorption system for centrifuges employing double sector cells which permits separation of the images formed by each of the sectors and recording of the same individually on a photographic plate to give base line and solution patterns.

The foregoing and other objects of the invention will become more clearly apparent from the following description when taken in conjunction with the accompanying drawing.

Referring to the drawing:

FIGURE 1 schematically shows a rotor having mounted therein a double sector cell and the absorption optical system associated therewith;

Figure 1:
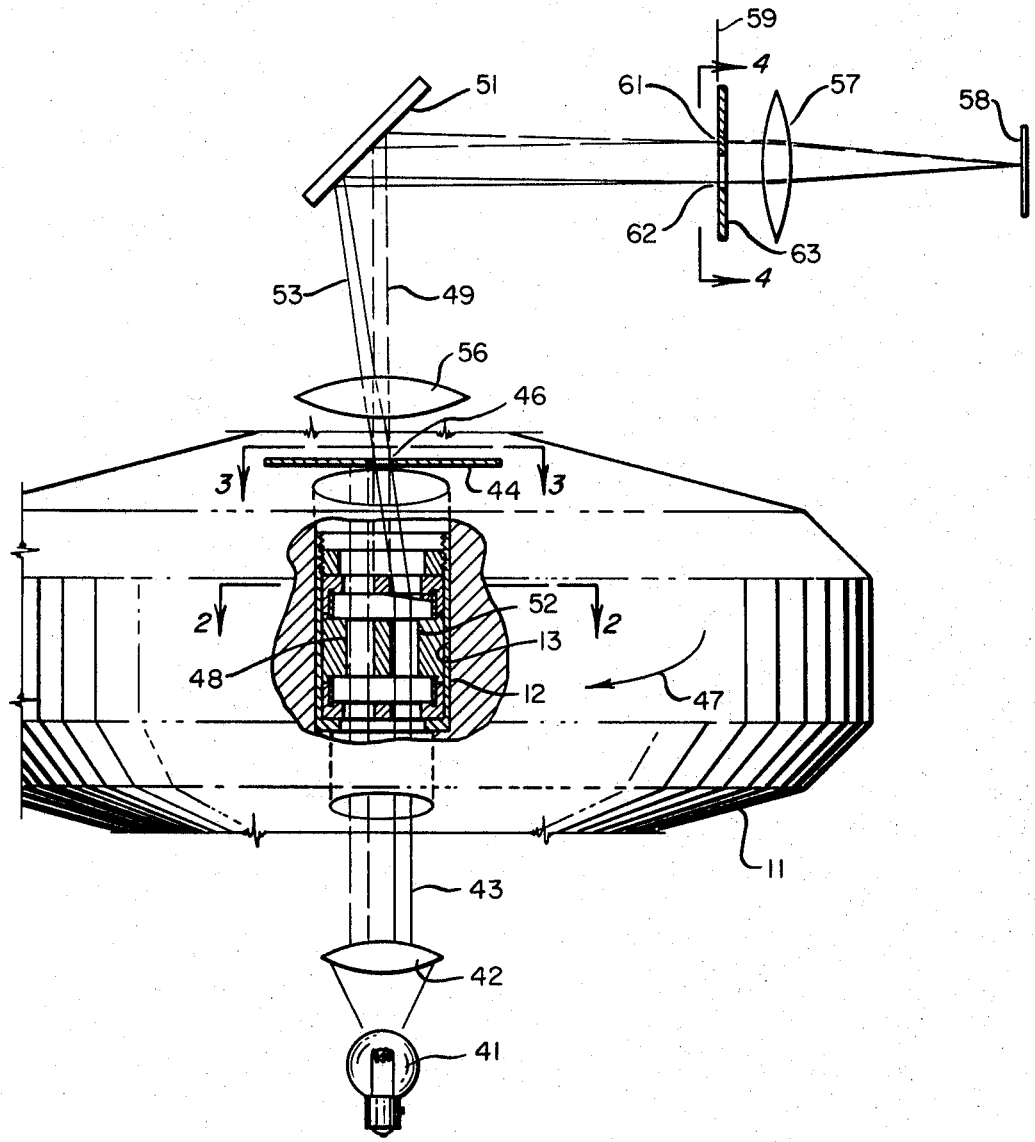

Referring to FIGURE 1, there is shown a rotor 11 which is rotated in a centrifuge at relatively high rotational velocities. For example, the rotor may be disposed in an ultracentrifuge of the type known as the Spinco Model E Analytical Ultracentrifuge produced by the Spinco Division of Beckman Instruments, Inc., Palo Alto, Calif.

One or more sample cells 12 are mounted within wells 13 formed in the rotor. The cell 12, in accordance with the present invention, is a double sector cell including means for deviating the light path through one sector.

Figure 5:
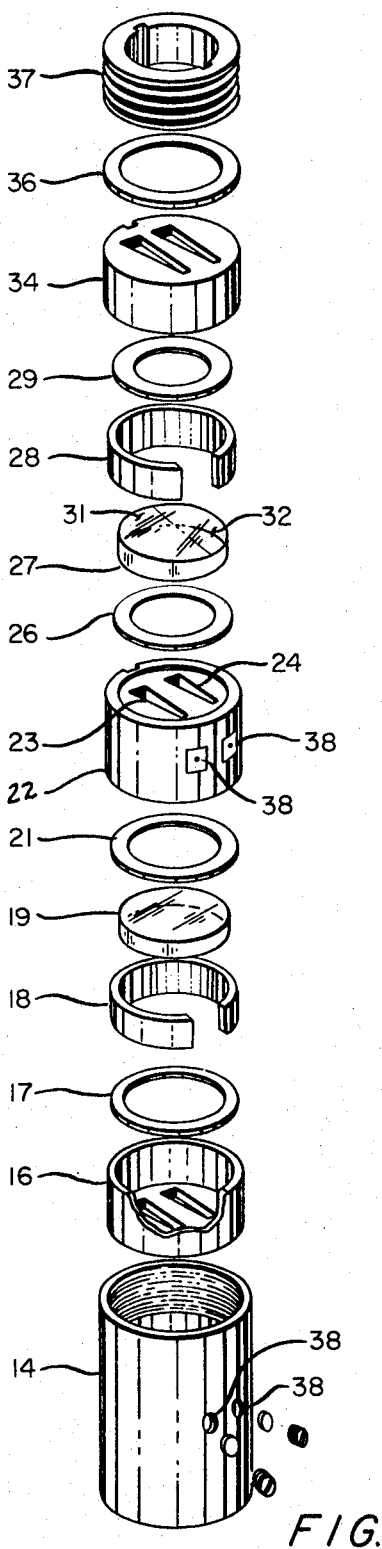
FIGURE 5 is an exploded view of a double sector cell in accordance with the present invention.
Figure 2:
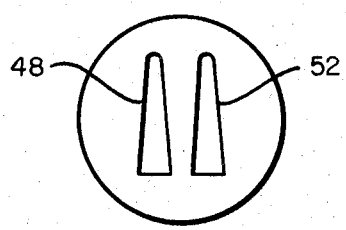
FIGURE 2 is a view taken along the line 2—2 of FIGURE 1 showing the double sector cell.

An exploded view of a suitable double sector cell is shown in FIGURE 5. The cell includes an outer housing 14 which serves to accommodate the various parts of the cell assembly. The cell assembly includes a lower window holder 16; a window assembly comprising gasket 17 mounted within the holder; a liner 18 for lining the space between the holder 16 and quartz window 19; and gasket 21. Mounted above the lower quartz window is the double sector center piece 22. The double sector center piece is a short cylinder with a pair of sector-shaped openings 23 and 24 formed therein. The ends of the openings are sealed by the lower window 19 and upper window to be presently described. The openings are sector-shaped to permit the solute to sediment radially from the axis of rotation without hitting the walls of the sector. Disposed above the double sector center piece 22 is another window and gasket assembly similar to that described and including a gasket 26, quartz window 27, liner 28, gasket 29 and window holder 34.

As will be presently described, the upper window is specially formed in accordance with the invention to have a planar portion 31 and a wedged portion 32 which serves to deviate the light beam passing through one sector, as will be presently described. That is to say, as may be readily seen from an examination of FIG. 1, a longitudinal cross-section of the quartz window 27 includes a planar portion and a wedge-shaped portion. The plane portion goes over one of the sectors, while the wedge portion fits over the other section. The wedge half of the cell window deviates light towards the center for purposes to be described with reference to FIGURE 1. The holder 34 accommodates the upper window assembly. The holder is provided with a wedge portion for accommodating the wedged window. An upper gasket 36 is provided with a screw ring 37 which is screwed down into the housing to house and seal the complete assembly within the housing 14.

The two cell sectors are filled with syringe needles inserted through small openings 38 extending through the cell housing and center piece at the inner edge of the sectors.

Figure 3:
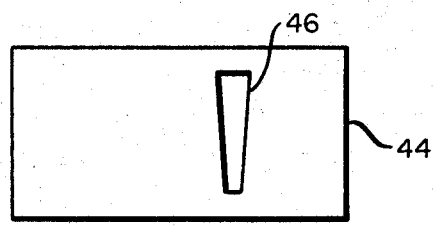
FIGURE 3 is a view taken along the line 3—3 showing the fixed mask associated with the cell.

Referring now again to FIGURE 1 wherein the rotor is shown with the double sector cell facing towards the front of the figure, there is shown an optical system which includes a light source 41 and a collimating lens 42 forming a collimated beam 43 which is directed onto the rotor at the location at which the cell rotates past the optical system. The collimated light in the position shown travels through the two adjacent cells and impinges upon a fixed mask 44 which has a sector-shaped opening 46 as shown more clearly in FIGURE 3. Assuming that the rotor is rotating in the direction shown by the arrow 47, the first sector 48 first passes in cooperative relationship with the opening 46 and the light travelling through this sector travels upwardly as shown by the dotted line 49 and impinges upon the plane, angled mirror 51. An instant of time later, the second sector 52 is in cooperative relationship with the opening 46 and the light travelling through this cell passes through the opening 46. However, due to the wedge-shaped sector formed in the lens, the light is deviated to the left as viewed in the figure and strikes the mirror 51 at a location slightly below that previously described as shown by the solid lines 53. In other words the wedge shaped portion of quartz window 27 exhibits a different angle of refraction with respect to the light rays passing through the cell assembly than that of the planar portion so that the light emerging from each cell sector of the assembly travels in a distinct path. A condensing lens 56 cooperates with a camera lens 57 to form the optical system which projects the image of the sectors onto the photographic plate 58.

Figure 4:
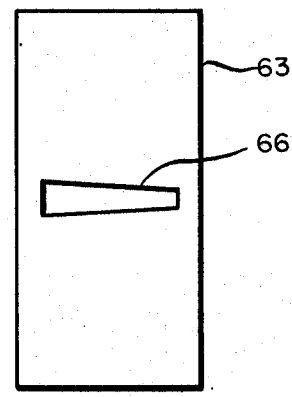
FIGURE 4 is a view taken along the line 4—4 showing the movable mask.

The camera lens 57 is focused on the cell and has a first focal point generally along the line 59. It is seen that along the line 59, there are formed two images 61 and 62 corresponding to the first sector 48 and second sector 52, respectively. At this point, the two images are separated and a mask 63 may be inserted to block out either one of the two images. The mask 63 may be of the type shown in FIGURE 4 and include a sector-shaped opening 66 which corresponds to the size of the image at the location 59. Each of the two images are focused on the same point on the photographic plate 58. However, by blocking out one image, it is possible to photograph either one of the two cells. Movement of the film 58 and of the mask 63 will permit photographing of the other image at a separate location on the film.

Thus, in operation, the centrifuge is caused to rotate and the mask 63 is placed in a first location for a period of time, during which time the film is exposed and a photograph of one of the sectors is taken. Subsequently, the film and mask are moved to provide a second photograph of the second cell. One of the cells may provide the base line or carry the solute, while the other carries the solution.

Thus, it is seen that the double sector cell may be used in conjunction with absorption studies. A mask is selectively moved in an optical system which provides two images to selectively mask or block one of the images so that only one image impinges on the photographic plate. Simultaneous movement of the film and mask provides two distinct photographs, one showing the base line or solute distribution while the other shows the base line including solute plus solute particles. Thus, there is provided a simple system employing double sector cells for studying ultraviolet and other absorption characteristics of solution.

I claim:
1. A centrifuge system comprising a rotor having an axis of rotation, a sample cell assembly carried by said rotor and disposed in radial direction from said axis of rotation, said cell assembly including two sectors, a window having a cross-section including a plane portion and a wedge portion forming one wall of said sectors with the plane portion disposed in cooperative relationship with one of said sectors and said wedge portion in cooperative relationship with the other, said wedge portion tapering from the plane portion to one edge of the window, a light source, means for directing light from said source through said cell, a camera lens disposed to receive light emerging from said cell, a photographic plate cooperating with said camera lens, and a mask disposed intermediate the cell and photographic plate to intercept one of the cell images whereby to permit projection of only one of the cell images onto the photographic plate.

2. A centrifuge system comprising a rotor having an axis of rotation, a cell assembly carried by said rotor and disposed in a radial direction from said axis of rotation, said cell assembly including two sample sectors, a window having a cross-section including a plane portion and a wedge portion forming one wall of each of said sample sectors with the plane portion disposed in cooperative relationship with one of said sectors and the wedge portion in cooperative relationship with the other, said wedge portion tapering from the plane portion to one edge of said window, a light source, means for directing light from said source through said cell, said wedge serving to deviate the image from the corresponding sector, a first mask disposed adjacent said cell and adapted to successively pass the light from each of said sectors as the cell is rotated past the mask, a camera lens disposed to receive light from said cell assembly, a movable photographic plate disposed to receive the projected image from said lens, and a movable mask disposed intermediate the cell and photographic plate to intercept one of the sector images to permit projection of only one of the images on the photographic plate at one time so that individual images of each of the sectors may be photographed by movement of the mask and plate.

3. A centrifuge system comprising a rotor having an axis of rotation, a sample cell assembly carried by said rotor and disposed in a radial direction from said axis of rotation, said cell assembly comprising a center piece having formed therein two sector-shaped openings, a bottom window sealing the lower end of said openings and an upper window sealing the upper end of said openings, means for maintaining the windows in sealed engagement with said center piece, said upper window having a cross-section including a planar portion and a wedged portion with the planar portion disposed in cooperative relationship with one of said cells and the wedged portion in cooperative relationship with the other of said cells said wedged portion tapering from said planar portion to one edge of said window, a light source, a collimating lens serving to collimate the light from said source and direct the same through the cell assembly, a first mask disposed in cooperative relationship with said cell assembly and including a sector-shaped opening, a condensing lens serving to receive the light projected through said sector-shaped opening, a camera lens, and a movable photographic plate disposed at the focus of said camera lens, and a movable mask disposed intermediate the cell and photographic plate to intercept one of the sector images to permit projection of only one of the sector images onto the photographic plate at one time whereby upon movement of the photographic plate and movable mask, independent photographs of the light transmitted through each of the sectors may be made.

4. A centrifuge system comprising a rotor having an axis of rotation, a sample cell assembly carried by said rotor and disposed in a radial direction from the axis of rotation, said cell assembly including two sectors, a light source, means for directing light rays from the light source through the cell assembly, a window forming one wall of the cell assembly, said window including at least two contiguous surfaces each being orientated at a different angle with respect to the beam of light rays traveling through the cell assembly, one of said portions disposed to cooperate with one of said sectors and the other portion disposed to cooperate with the other of said sectors whereby the light rays associated with one sector emerge from the window in a first path and the light rays associated with the other sector emerge from the window in a second path, means to successively transmit the light associated with each sector as the cell is rotated past said means, sensing means cooperating with said cell assembly and adapted to sense the light rays associated with each sector, and a first movable mask disposed intermediate said sensing means and the cell assembly to selectively intercept the light rays associated with one of the sectors to thereby permit the sensing means to sense light from only one of the sectors at a time.

5. A centrifuge system as defined in claim 4 wherein the means to successively transmit the light comprises a second mask having an aperture therein and disposed adjacent to the cell assembly to successively pass the light associated with each sector as the cell is rotated past the second mask.

6. A centrifuge system as defined in claim 5 wherein said sensing means includes a camera lens and a photographic plate, the photographic plate being movable in conjunction with the movable mask so as to provide recorded images of each cell sector adjacent to one another for subsequent examination.

7. A centrifuge system comprising a rotor having an axis of rotation, a sample cell assembly carried by said rotor and disposed in radial direction from said axis of rotation, said cell assembly including two sectors, a light source for providing a light beam traveling in a first path toward said cell assembly, a window forming one wall of said cell assembly, said window including at least one surface positioned substantially perpendicular to the path of said light beam and a second surface extending from said first surface to an edge of the window and disposed at an acute angle with respect to the path of said light beam, the first surface being disposed in a cooperative relationship with one of said sectors and the second surface being disposed in a cooperative relationship with the other of said sectors, recording means for sensing the light passing through said sectors of the cell assembly and a mask interposed between said recording means and the cell assembly to successively pass the light from each of said sectors as the cell is rotated past the mask.

References Cited
UNITED STATES PATENTS 2,885,188   5/1959   Pickels et al. _____ 233—26
3,174,341   3/1965   Sudo et al.

JEWELL H. PEDERSEN, *Primary Examiner.*

O. B. CHEW, *Assistant Examiner.*